United States Patent [19]

Emo et al.

[11] Patent Number: 4,843,232
[45] Date of Patent: Jun. 27, 1989

[54] OPTIC SWITCH AND SPEED SENSOR

[75] Inventors: Stephen M. Emo, Elkhart; Terrance R. Kinney, South Bend, both of Ind.

[73] Assignee: Allied-Signal Inc., Morristown, N.J.

[21] Appl. No.: 138,258

[22] Filed: Dec. 28, 1987

[51] Int. Cl.⁴ .............................................. G02F 1/01
[52] U.S. Cl. .................................... 250/225; 250/227; 250/231 SE; 324/260; 350/374
[58] Field of Search .................. 250/225, 227, 231 R, 250/231 SE; 324/96, 244, 260, 262; 350/374–376

[56] References Cited

U.S. PATENT DOCUMENTS

| | | | |
|---|---|---|---|
| 3,324,393 | 6/1967 | Casey et al. | 250/225 |
| 3,466,541 | 9/1969 | Bernard et al. | 250/225 |
| 3,502,978 | 3/1970 | Bernard et al. | 250/225 |
| 3,625,617 | 12/1971 | Di Chen | 250/225 |
| 3,738,756 | 6/1973 | Chaney | 250/227 |
| 3,743,929 | 7/1973 | Lesueur | 250/225 |
| 4,539,521 | 9/1985 | Matsumoto | 250/225 |
| 4,560,867 | 12/1985 | Papuchon et al. | 250/227 |
| 4,563,639 | 1/1986 | Langeac | 250/227 |
| 4,564,754 | 1/1986 | Sato et al. | 250/225 |
| 4,698,497 | 10/1987 | Miller et al. | 225/231 R |

Primary Examiner—David C. Nelms
Assistant Examiner—Stephone B. Allen
Attorney, Agent, or Firm—Leo H. McCormick, Jr.; Ken C. Decker

[57] ABSTRACT

An electro-optic speed sensor for sensing the speed of rotation of a rotating sending unit which includes an optical switch transducer for sensing disturbances in a magnetic field caused by the passage of a rotating magnetic sending wheel on the rotating member. The optical switch transducer uses a Faraday material and provides its signal by rotating the polarity of polarized light from a first source of light having a first bandwidth while allowing a second source of light having a second bandwidth to pass through unaffected. The first and second sources of light are thereafter, reflected within the transducer. The disturbances in the magnetic field generate an optical signal resulting from changes in the Faraday rotation. A photodetector receives the light from the first source to develop an operational signal corresponding to the speed of rotation of the rotating member and light from the second source to check on the continuity of the sensor system.

2 Claims, 2 Drawing Sheets

OPTIC SWITCH AND SPEED SENSOR

FIELD OF THE INVENTION

The present invention relates to optical communication and to the sensing of position using a magnetic sensing arrangement. The invention has particular applicability to sensing of rotational speed or of, for example, a rotating shaft, or a switch lever.

BACKGROUND OF THE INVENTION

The present invention relates to devices for sensing the speed of an object, typically a rotating object, and in particular to such a device operable for generating a light pulse signal as a function of speed that is transmittable by means of a fiber optic conductor to a remote display and/or control device.

Electronic devices are being increasingly utilized to sense and manage the operation of machinery. In one such application, such electronic devices are utilized in electronic engine controls for gas turbine engines. In another such application, such control devices are utilized to monitor the rotational behavior of a vehicle's wheels and to control the application of braking pressure to avert skids.

In yet another application, such control devices are utilized to respond to manual commands operator inputs, to alternate the outputs of the control.

In the case of speed sensors used in antiskid systems such as Class B and C antilock brake systems for passenger cars, accurate speed sensing is needed at low wheel speeds. Antiskid traction systems must detect slight wheel movement in order to detect impending loss of traction at low speeds.

In the case of an electronic engine control, it is increasingly desirable to limit if not eliminate, the use of electrical conductors between sensors and controllers and the electronic control units to reduce the effects of EMI and EMP, lightning and other induced electrical noise. In the case of automotive applications, fiber optic connections substantially reduce in effect of the various sources of electronic noise such as alternators, ignition systems, and the like.

One particular type of transducer utilized in such systems is a speed transducer, that is, a device which generates a signal proportional to the speed of a machine such as a turbine engine or the wheel of a motor vehicle. Heretofore, transducers for generating such a speed signal have used electrical conductors to communicate with a remote electronic control or display or, in the alternative, have incorporated relatively expensive circuits for generating a light pulse signal suitable for transmission to the electronic control unit. As a result there exists a need for an improved speed transducer which produces a speed signal suitable for transmission by means of fiber optics without an external electrical power source in addition to being rugged, and relatively inexpensive.

It is therefore an object of the invention to provide an improved speed transducer. Another object of the invention is to provide such a transducer which produces a light pulse signal proportional to speed of an object. Another object of the invention is to provide a sensor system which can not only monitor the rotating speed of a shaft but can also be used to provide a signal proportional to a discrete switch position.

SUMMARY OF THE INVENTION

The passive fiber optic speed sensor system of this invention is based on optical Faraday rotation. Faraday rotation simply is, the property of a material to rotate the linear polarization vector as a function of both the magnetic field the material is in and the optical path length of the material. The sensor requires an LED light source for excitation which is transmitted to the sensor via an optic fiber. Speed information is then imposed on the excitation signal via magnetic coupling, which modulates the intensity of the light by changing the magnetic flux density through the Faraday material in relation to either the passage of a ferrous or magnetic material mounted on a rotary shaft. The modulated signal is then captured and transmitted through the return fiber to the electronic control's optic interface.

Advantages of the passive fiber optic speed sensor system are:
uses inexpensive, low power, high reliability excitation;
uses common core multimode fiber;
solid state construction and magnetic coupling isolating the optic path from contamination;
DC to over 20 kHz response;
constant signal amplitude;
no system calibration required; and
optic fiber failure detection can be added to the system, without adding components to the sensor.

Two different configurations of this type of sensor systems are presented. The heart of both systems is the Faraday rotation material. When exposed to a magnetic field, this material rotates the linear polarization vector of the incident light due to coupling between the electric field vectors of the "photons" and the electric field vectors of the magnetically aligned atoms of the Faraday material. However, when the magnetic flux in the Faraday material is changed, the degree of alignment of the atoms of the Faraday material changes, which causes the net coupling efficiency to change, thus causing the net rotation of the polarization of the light beam to also change. The second feature of the Faraday material is that the material has wavelength dependant rotation. Simply, the materials will rotate the polarization vector of one wavelength or color while not rotating the polarization vector of other wavelengths. The major differences between these sensor systems is how the magnetic field is mechanized.

DESCRIPTION OF THE PREFERRED EMBODIMENTS

Figure 2:
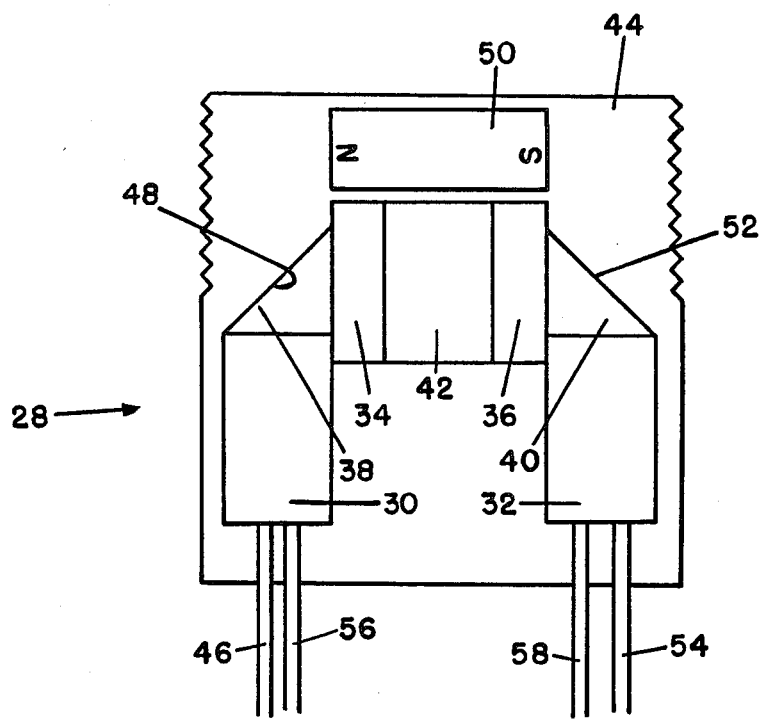
FIG. 2 is the sensor of FIG. 1 having prisms for directing an optical signal path.

The sensor system has a magnetic field on the rotating member while the sensor system shown in FIG. 2 has the magnetic field contained within the sensor head.

Figure 1:
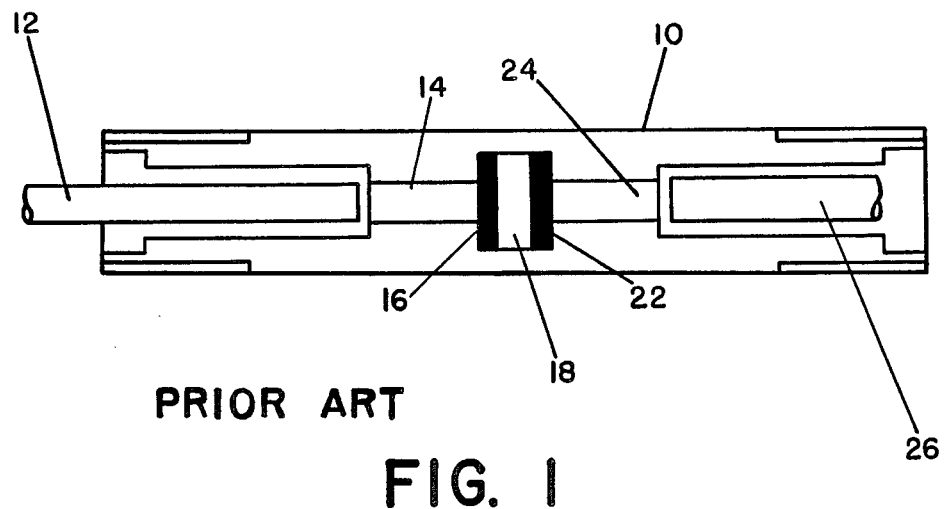
FIG. 1 illustrates a typical prior art sensor.

In sensor 10 shown in FIG. 1, light enters the sensor 10 from a fiber 12 and is collimated by the grated index lens (GRIN) 14. The collimated light then passes through a first linear polarizer 16. The polarized beam passes through the Faraday material 18 where the polarization vector is rotated as a function of the magnetic field in the Faraday material. When the sensor 10 is in close proximity to a magnet, not shown, the magnetic field in the Faraday material is increased thus increasing the rotation of the linear polarization vector by the Faraday material. However, when the magnet is removed, the field in the Faraday material is decreased, thus decreasing the rotation of the polarization vector. The light then passes through a second linear polarizer 22 tuned to give a maximum change in light intensity when moving from the magnet present (on) to the magnet absent (off) positions. Finally, the light is collected by the second GRIN lens 24 and focused into the return fiber 26.

In the sensor 28 shown in FIG. 2, two-GRIN lenses 30 and 32, two-linear polarizing plates 34 and 36, two-prism reflectors 34 and 40, the Faraday rotation material 42 and a magnet 50 are placed in a small housing 44. Light enters the sensor 28 from a first fiber 46, passes through the GRIN lens 30 where it is collimated, and reflected off of the surface 48 of the first prism 38. The collimated light then passes through the first linear polarizer 34. The polarized beam passes through the Faraday material 42 where the polarization vector is rotated as a function of the magnetic field in the Faraday material 42. When the sensor 28, including the magnet 50, is in close proximity to any ferrous metal such as a gear tooth, much of the flux from the magnet 50 is directed away from the Faraday material and through the ferrous metal which decreases the magnetic field in the Faraday material 42, thus decreasing their rotation of the polarization vector. However, when the ferrous metal is removed, the field in the Faraday material increases, again increasing the rotation of the polarization. The light then passes through a second linear polarizer tuned to give a maximum change in light intensity that can occur when the position of the ferrous metal is moved from an on position to an off position with respect to the Faraday material 42. Finally, the light is reflected off the right face 52 of the second prism 42, collected by the second GRIN lens and focused into the return fiber 54. By locating a input fiber 56 off center on the input GRIN lens 30 and an output fiber 58 off center of the output GRIN lens 32, two separate and independent light paths are formed allowing for a dual redundant sensor configuration.

Figure 3:
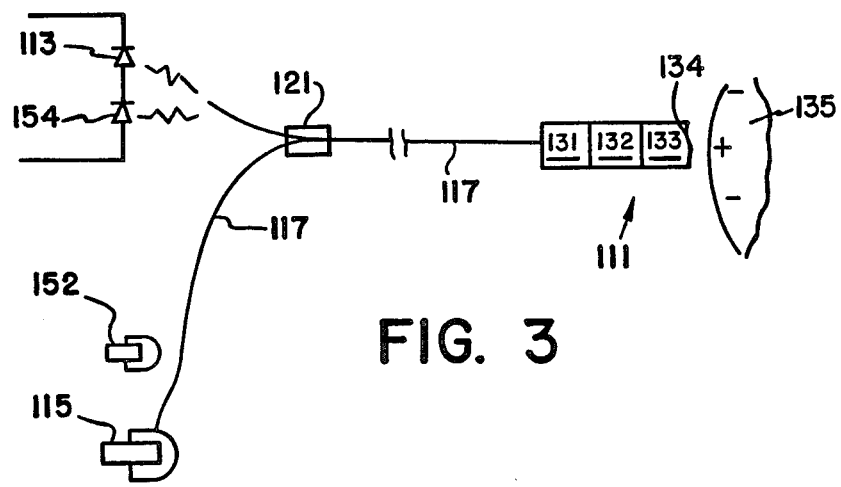
FIG. 3 is a schematic diagram showing a configuration for a magneto optic switch constructed in accordance with a preferred embodiment of the invention.

The sensor 111 shown in FIG. 3 is adapted for optically sensing the speed of a rotating member 135. The sensor 111 operates by a Faraday rotation material 131 receiving polarized light from a source 113 through fiber 117. The light that is provided through the optical fiber 117 and is collimated by a graded index lens 131. The collimated light then enters the fixed linear polarizer.

The polarized 132 light that enters the Faraday rotation material 133 is attentuated as a function of the rotation of the polarization axis of the crystal. The light that passes through the Faraday material or rotator 133 is then reflected back into the rotator by a mirrored surface 134 on the end of the material. The remaining light is then returned to the fixed polarizing crystal 132, where it either pass through or is attenuated into a different vector plane. Any light which remains after passing through the polarizing crystal 126 and the Faraday rotator 133 in both directions is then focused back into the fiber 117 where it can be interrogated by the sensing system 115.

Faraday crystal rotation material 133 is excited by a rotor 135 which includes a magnet at the crystal end. Thus, when the magnet in rotor 135 is moved from the south pole being exposed to the crystal or Faraday material 133 to the north pole being exposed to the crystal the crystal changes its polarization axis. It should be noted that some of the Faraday rotation crystals also have a hysteresis function which results in the polarization rotation not changing with the removal of the magnetic field but only with the introduction of an opposite field, thus enabling a momentary throw latching switch.

The Faraday rotator or material only exhibits the vector rotation effect within a narrow ban width of light. Thus it is possible to have an additional light source 154 outside of the bandwidth in order to obtain a parity check of signal transmission from the sensor 111.

The sensor 111 shown in FIG. 3 operates as a switch to control communication of light emitted from a preferred light source 113 to be received by a sensor 115. The light is transmitted through optical fibers 117, as will be described. The use of optical fibers 117 provides several advantages, including reduced weight, increased signal carrying capacity and reduced interference. In the instant case, the use of optical fiber conductors 117 also allows the switch 111 to operate with a single conductor.

The switch 111 functions by receiving light from light source 113 and selectively transmits light in a return direction to be received by a sensor 115. The directional nature of light permits the same conductor to be used for providing a signal source and returning a signal in accordance with the switching function. A directional coupler 121 allows light transmitted from the switch 111 to be transmitted to the sensor 115. Therefore, the path by which light from the source 113 may reach the sensor 115 is through the switch 111.

The switch 111 includes a graded index lens (GRIN) 131 which collimates the light being transmitted by the source 113 through the fibers 117. The collimated light is then polarized by a linear polarizer 132 which passes the polarized light to a Faraday rotation material 133. The Faraday rotation material has the property of rotating optical linear polarization vector in the presence of a magnetic field, for example from a magnetized wheel 135. This, property is known as Faraday rotation. In the embodiment shown, this property of rotation occurs under a north magnetic field, whereas a south magnetic field does not effect rotation. The rotation is approximately 45 deg. A reflective surface 134 causes light transmitted through the Faraday rotation crystal 133 to be reflected back through the Faraday crystal 133. This light is then further rotated in accordance with the magnetic field, so that the total rotation is approximately 90 deg. The reflected light is then caused to pass the fixed polarizer 132. If the light is not rotated in direction of the fixed polarizer 132d substantially attenuates the reflected light. Therefore, the Faraday rotation will cause the light reaching the sensor 115 to be substantially attenuated.

Figure 4A:
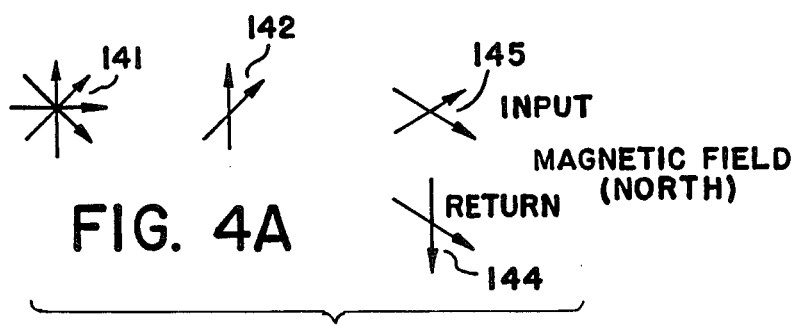
FIGS. 4A and 4B show polarization configurations for the sensor positions of the embodiment of FIG. 3.
Figure 4B:
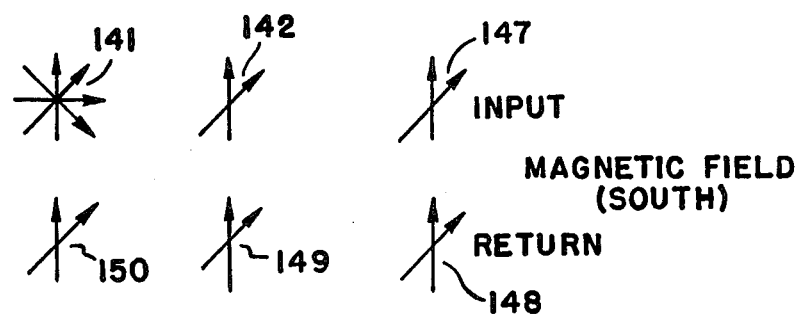

Referring to FIG. 4A, light from the light source 113 passing through the GRIN 131 exhibits multiple polarization, represented at 141. The polarizer 132 establishes a fixed polarization of the light, represented at 142. If the Faraday rotation material 133 is under the effect of a north magnetic field, light arriving at the reflective surface 134 is rotated, as represented at 145. This light is then returned through the material 133 to be further rotated, as represented at 144 and is attenuated at the polarizer 132, resulting in attenuated return light. As shown in FIG. 4B, the exposure of the rotation material 133 to no magnetic field results in light passing through the material not being rotated, as represented at 147 and 148, so that the light being returned through the polarizer 132 is polarized in the same direction, represented by 149 as the light passing in the other direction (from the light source 113). Thus light is returned to the sensor 115 which is attenuated only by polarization, as represented by 150.

The Faraday rotation material 133 exhibits its property of rotation only within a narrow bandwidth. Therefore, it is possible to provide an integrity check in at least two ways. Since the attenuation by the switch 111 is not complete, a minimum light level can be used to establish continuity of the conductor 117. The light source 113 may also transmit a broad enough light spectrum to enable light outside the bandwidth to be reflected at a fixed level and a second detector 152 can be used to provide a parity or integrity check. As an alternative, light transmitted outside of the preferred spectrum can also be provided by a second light source such as LED 154.

Although the present invention has been illustrated and described in connection with example embodiments, it will be understood that this is illustrative of the invention, and is by no means restrictive, thereof. It is reasonable to be expected that those skilled in the art can make numerous revisions and additions to the invention and it is intended that such revisions and additions will be included in the scope of the following claims as equivalents of the invention.

What we claim is:

1. An electro-optic sensor system comprising:

means for generating a first source of light having a first bandwidth;

means for generating a second source of light having a second bandwidth;

means for collimating the first and second sources of light;

means for polarizing the first and second sources of collimated light;

a Faraday material for receiving the polarized first and second sources of collimated light, said Faraday material rotating the linear polarization vector of said first source of collimated light while allowing said second source of collimated light to pass through without being affected;

means for moving a ferrous metal with respect to said Faraday material causing the polarized vector of said first source of collimated light to be modified as a function of a magnetic field produced in said Faraday material; and photodetector means for receiving collimated light of said first and second sources from said Faraday material, said photodetector means creating a first output signal which represents the movement of the ferrous metal with respect to said Faraday material and second output signal which represents said second source of light, said second output signal being compared with a reference to assure that the first output signal is the result of the relationship of the Faraday material and ferrous metal.

2. The electro-optic sensor system, as recited in claim 1 further including:

means to reflect said first and second sources of collimated light back through said Faraday material to enhance the rotation of the linear polarization vector of said first source of collimated light.

* * * * *